Patented Oct. 19, 1948

2,451,471

UNITED STATES PATENT OFFICE 2,451,471

PREPARATION OF A CO-PRECIPITATED GEL CATALYST

Robert E. Burk and Everett C. Hughes, Cleveland Heights, Ohio, assignors to The Standard Oil Company, Cleveland, Ohio, a corporation of Ohio No Drawing. Application January 20, 1942, Serial No. 427,524

2 Claims. (Cl. 252—254)

1

Various suggestions have been made for the preparation of supported catalysts carrying oxides and metals of the sixth periodic group, the support or carrier being granules of clays, magnesium oxide or aluminum oxide, and the chromium oxide and molybdenum oxide being coated on the surface of such granules. Aluminum oxide in such conditions is largely masked from contact with raw material being catalyzed, and action which might be contributed is correspondingly lost. Moreover because of the lack of molecular intermingling, any stabilizing action the aluminum oxide might contribute is low. We have found that catalysts of superior properties may be prepared in a three-component system in which the components are particularly intimately commingled and brought together in co-precipitation of gel type, the resultant components being oxides of aluminum, molybdenum and chromium. Aluminum is toward the basic end of the periodic system, and molybdenum and chromium are toward the acid end. Whether under the conditions of preparation we apply, a loose combination of the components may result, or a more effective contact and opportunity for action of the components is involved, is not known. At any rate however, catalysts of the present invention are capable of outstanding action, and with very little difficulty from coke production.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The most desirable manner of preparation of the present catalysts is such that gives a maximum intimacy of mixture of the three components. The aluminum oxide component should predominate, and the molybdenum oxide and chromium oxide should not exceed 30 mol per cent each and should not be less than 2 mol per cent each, the aluminum oxide making up the remainder, and the molybdenum oxide may be in greater or smaller amount than the chromium oxide. Illustrative modes of preparing the catalysts are as follows:

A solution of sodium or potassium aluminate is neutralized with an acidic solution containing chromic acetate or sulphate and ammonium paramolybdate $(NH_4)_6Mo_7O_{24}.4H_2O$. Preferably the solutions are pumped together or flowed together,

2 in the ratio to give the desired catalyst compositions. In effect, the chromium and molybdenum are precipitants for the aluminum, and vice versa, so that perfect homogeneity is obtained in the precipitate. The hydrogen ion concentration in the solutions is adjusted such that the final mother liquor of the precipitated catalyst is 9 to 11 pH, preferably 10. Where the high concentrations of molybdenum oxide are involved, i. e. on the order of 20 to 30 mol per cent, lower pH values than 10 may be used, as down to 6, thereby providing substantially complete incorporation of the molybdenum. After precipitation the catalyst is washed, and dried. The drying is preferably carried out at around 140° F. until in a hard granular condition, then the material is ground and meshed to size, after which it is given a final drying in which the temperature is gradually raised to that at which it is to be used, e. g. 900–1000° F. The catalyst may then be cooled and preferably be given a short wash with boiling water until molybdenum blue shows in the wash water. Such wash removes any water-soluble salts that have come to the surface of the catalyst in the drying operation.

As another example: Ammonium paramolybdate and chromium and aluminum acetates and sulphates or nitrates are mixed in a single solution having a pH below 4. Then ammonium hydroxide or other alkali hydroxide is admixed to precipitation, and the product is washed and dried. Preferably, the drying involves a first-stage drying at around 140° F., grinding and sizing, and finally heating at high temperature, and final washing, as above.

As another example: Aluminum and chromium salts in solution, such as the above salts, are precipitated with ammonium hydroxide or alkali hydroxide, and the slurry of the precipitate in the mother liquor or after filtration and washing is mixed with a solution of ammonium paramolybdate such that the final pH is 6 to 11. The highest pH in this range is used which will allow substantially complete incorporation of the molybdenum oxide with the other oxides. The product is washed and dried, and preferably the detail of the drying first at around 140° C., grinding and sizing, and finally drying at high temperature, then washing, may be applied.

Ammonium paramolybdate, which is preferred, as in the foregoing, may in some cases be substituted by other soluble compounds of molybdenum, including the reduced form known as molybdenum blue and even lower valence forms.

More detailedly, as illustrating proportions of components which may be applied, the following examples may be noted.

I. A mixture of 0.6 mol $Cr(C_2H_3O_2)_3$, 10.6 parts by weight of $(NH_4)_6Mo_7O_{24}.4H_2O$, and 35 parts by weight of concentrated $H_2SO_4$, is diluted to form 22,000 parts of solution. Another solution is prepared by diluting to 2,000 parts of water a product of reaction of 2.4 mols of heavy aluminum hydrate and 3.0 mols of NaOH. The two solutions are brought together at a suitable rate, the pH being maintained at 9.7-9.9. The precipitate is aged for about two hours, filtered and washed with about 24,000 parts of water, and is then dried, preferably at 140° F. for about 110 hours and for 2 hours at 900° F. under line vacuum of 50-100 mm. Hg. In this catalyst the mol ratios of components may be 70 mol per cent aluminum oxide, 2 mol per cent of molybdenum oxide, and 20 mol per cent of chromium oxide.

II. A catalyst is made up to a composition of gel-type oxides in proportions of 70 Al: 10 Mo: 20 Cr oxides, by diluting a mixture of 0.6 mol $Cr(C_2H_3O_2)_3$, 30 parts by weight of concentrated $H_2SO_4$ and 53 parts by weight of $$(NH_4)_6Mo_7O_{24}.4H_2O$$

to 22,000 parts water solution, and then admixing this at a suitable rate and a solution made by reacting 2.1 mol of $Al(OH)_3$ and 3.7 mol of NaOH to form $NaAlO_2$ and diluting to 2,000 parts. The pH of the mother liquor is 9.7-9.9. The precipitate is aged for about 18 hours, filtered and washed with about 24,000 parts of water. The catalyst is dried, e. g. at 140° F. for 60 hours and at 900° F. for 1 hour under vacuum after which it is quenched from 500° F. in boiling water. The catalyst is then preferably washed until molybdenum blue shows in the wash water, and it is then further dried at 140° F. for about 18 hours and at 500° F. for about 2 hours under vacuum.

III. 2.34 mol of $Al(NO_3)_3.9H_2O$ and 0.06 mol of $Cr(NO_3)_3.9H_2O$ and 0.6 mol of $$(NH_4)_6Mo_7O_{24}.4H_2O$$

are dissolved in 20,000 parts of water. A solution of 490 parts by weight of concentrated $NH_4OH$ to 3,000 parts of water is mixed with the aforesaid solution, with a resultant pH of 7.1. After aging for about two hours, the slurry is filtered and washed on the press with 20,000 parts of water, and the cake is dried for about 16 hours at about 140° F., and is sized to ten to twenty mesh, and finally heated to 900° F. under vacuum, the latter temperature being held for about an hour.

The present three-component catalysts are particularly effective for operation on hydrocarbons, etc., in dehydrogenating and cyclicizing. Thus, hydrocarbons of at least six carbon atoms may be aromatized, and aliphatic hydrocarbons or paraffins and olefins and naphthenic hydrocarbons or their mixtures, naphthas, distillates, and non-benzenoid hydrocarbons in general may be operated upon. Where aromatic compounds are also present in the stock, these may be preliminarily removed if desired, as for instance by solvent extraction, formation of complexes with halides, etc., but removal of aromatic compounds is not necessary. The feed rate of hydrocarbons to the catalyst may be 0.1-10 liquid volumes/volume catalyst/hour.

Aromatization with the present catalysts is most effectively carried out with the presence of hydrogen under pressure. Partial pressures of hydrogen up to 300 pounds per square inch may be used, preferably 50-300 pounds per square inch.

The hydrogen may be passed in with the naphtha for instance, using 0.1-10 mols of hydrogen per mol of naphtha feed. The hydrogen may be from any convenient source. In some cases it is desirable to re-circulate a portion of the off-gases. The gas may be added to the naphtha vapors all at once before admitting to the catalyst zone, or may be added in successive portions to successive trays for the catalyst contact. Temperatures of 850-1200° F. are applied. And at the higher temperatures correspondingly shorter contact times may be used.

After contacting with the catalyst, aromatic and unsaturated hydrocarbons may be extracted from the product if desired, for example by sulphur dioxide or high boiling amine or hydroxide compounds or combinations of such or other solvents, and the undissolved or benzenoid portion may be re-contacted with the catalyst. In some cases the product as coming from the catalyst zone may be distilled and used directly for motor fuel etc. And, in some cases a narrow cut may be used as charging stock and pure aromatics may be separated primarily by distillation.

In tests against two-component catalysts of aluminum and chromium or aluminum and molybdenum, operating on a 52.5 A. P. I. gravity Illinois naphtha of 190-408° F. boiling range, at 980° F. catalyst zone temperature, and 100 pounds per square inch pressure, with 3 mols of hydrogen to 1 mol of naphtha, and 1.3 vols. of liquid feed per volume of catalyst per hour, comparative results were as follows:

| Catalyst Composition (As Oxides) | Per Cent Aromatics and Olefins in Product |
| --- | --- |
| 80Al:20Cr | 55 |
| 80Al:20Mo | 47 |
| 90Al:10Mo | 51 |
| 70Al:20Cr:10Mo | 60 |
| 78Al:20Cr:2Mo | 59 |
| 78Al:2Cr:20Mo | 58 |

In another test, with catalyst composition 70 mol per cent aluminum oxide, 10 mol per cent molybdenum oxide and 20 mol per cent chromium oxide, at 1,000° F., 200 pounds total pressure, hydrogen to naphtha mol ratio of 3.5:1, and flow rate 1.23 v. v. h., the product showed 63 per cent of aromatics and olefins, and 0.8 per cent of coke was deposited on the catalyst.

A particularly interesting distinction is that although chromium and molybdenum are in the same periodic group, it is found that molybdenum oxide containing catalysts have an additional function of isomerizing hydrocarbons, which action is not obtained by chromium-aluminum oxide catalysts.

Other modes of applying the principle of the invention may be employed, change being made as regards the details described, provided the features stated in any of the following claims, or the equivalent of such, be employed.

We therefore particularly point out and distinctly claim as our invention:

1. A process of making a co-precipitated aluminum-chromium-molybdenum gel type oxide cataylst, which comprises mixing (1) a solution of an alkali metal aluminate and (2) an acidic solution of chromium salt and ammonium paramolybdate, in desired ratio, with adjustment of the pH 6-11, the lower the concentration of molybdenum the higher the pH whereby all of said three oxide components are simultaneously precipitated by the mixing of the above two solutions, washing the precipitate, drying at about 140° F. to a hard granular state, grinding and sizing, drying and gradually raising the temperature to 900–1,000° F., cooling, and washing with boiling water until molybdenum blue shows in the wash water.

2. A process of making a co-precipitated aluminum-chromium-molybdenum gel type oxide catalyst, which comprises mixing (1) a solution of an alkali metal aluminate and (2) an acidic solution of chromium salt and ammonium paramolybdate, in desired ratio, with adjustment of the pH 6–11, the lower the concentration of molybdenum the higher the pH whereby all of said three oxide components are simultaneously precipitated by the mixing of the above two solutions, washing the precipitate, and drying.

ROBERT E. BURK.
EVERETT C. HUGHES.

REFERENCES CITED

The following references are of record in the file of this patent:

UNITED STATES PATENTS

| Number | Name | Date |
| --- | --- | --- |
| 2,157,204 | Grosse et al. | May 9, 1939 |
| 2,198,545 | Levine | Apr. 23, 1940 |
| 2,203,826 | Komarewsky | June 11, 1940 |
| 2,232,727 | Peterkin et al. | Feb. 25, 1941 |
| 2,236,514 | Burk | Apr. 1, 1941 |
| 2,249,337 | Visser et al. | July 15, 1941 |
| 2,258,111 | Engel | Oct. 7, 1941 |
| 2,280,060 | Burk et al. | Apr. 21, 1942 |
| 2,280,650 | Kassel | Apr. 21, 1942 |
| 2,285,396 | Danforth et al | June 9, 1942 |
| 2,289,918 | Lee et al. | July 14, 1942 |
| 2,355,388 | Michael et al. | Aug. 8, 1944 |

FOREIGN PATENTS

| Number | Country | Date |
| --- | --- | --- |
| 392,954 | Great Britain | May 22, 1933 |
| 410,771 | Great Britain | May 22, 1934 |
| 504,614 | Great Britain | Apr. 24, 1939 |